US009227812B2

United States Patent
Degawa

(10) Patent No.: US 9,227,812 B2
(45) Date of Patent: Jan. 5, 2016

(54) ADHESIVE SHEET JOINING METHOD AND ADHESIVE SHEET JOINING APPARATUS

(71) Applicant: NITTO DENKO CORPORATION, Ibaraki-shi, Osaka (JP)

(72) Inventor: Osamu Degawa, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 14/430,043

(22) PCT Filed: Oct. 31, 2013

(86) PCT No.: PCT/JP2013/079595
§ 371 (c)(1),
(2) Date: Mar. 20, 2015

(87) PCT Pub. No.: WO2014/069586
PCT Pub. Date: May 8, 2014

(65) Prior Publication Data
US 2015/0251870 A1 Sep. 10, 2015

(30) Foreign Application Priority Data
Nov. 5, 2012 (JP) .................................. 2012-243481

(51) Int. Cl.
*B29C 65/48* (2006.01)
*B32B 37/12* (2006.01)
*B32B 37/26* (2006.01)
*B32B 38/10* (2006.01)
*B32B 38/18* (2006.01)
*B65H 37/04* (2006.01)
(Continued)

(52) U.S. Cl.
CPC ............ *B65H 37/04* (2013.01); *B32B 37/0046* (2013.01); *B32B 37/12* (2013.01);
(Continued)

(58) Field of Classification Search
USPC ......... 156/249, 289, 701, 714, 719, 391, 537, 156/538, 750, 767
See application file for complete search history.

(56) References Cited

U.S. PATENT DOCUMENTS 5,078,670 A * 1/1992 Volkert ................ B42D 15/008
156/248
5,181,901 A * 1/1993 Volkert ................... B41F 17/02
156/227
(Continued)

FOREIGN PATENT DOCUMENTS

JP 2004-217376 A 8/2004
JP 2005-139218 A 6/2005
(Continued)

OTHER PUBLICATIONS

International Search Report for PCT/JP2013/079595 dated Jan. 14, 2014.

Primary Examiner — Sing P Chan
(74) Attorney, Agent, or Firm — Sughrue Mion, PLLC

(57) ABSTRACT

While a transporting unit transports an adhesive sheet attached to a separator larger than the adhesive sheet, a chuck member on a tip of a swing arm of a separating unit holds a portion of the separator protruding from an end of the adhesive sheet. Under such a condition, the chuck member moves in a direction crossing a transportation direction of the adhesive sheet, and the transporting unit moves in the transportation direction in synchronization with the chuck member while folding back the separator at an end of a supporting plate contacting the separator as a starting point. Accordingly, the separator is separated from the adhesive sheet. The transporting unit transports while holding the adhesive sheet with the separator separated therefrom to join the adhesive sheet to a workpiece.

7 Claims, 7 Drawing Sheets

(51) Int. Cl.
  *B65H 37/00* (2006.01)
  *B65H 41/00* (2006.01)
  *B32B 37/00* (2006.01)
  *B32B 37/18* (2006.01)

(52) U.S. Cl.
  CPC ............... *B32B 37/18* (2013.01); *B32B 38/10* (2013.01); *B32B 38/18* (2013.01); *B65H 37/00* (2013.01); *B65H 41/00* (2013.01); *B32B 2405/00* (2013.01); *B65H 2301/51122* (2013.01)

(56) References Cited

U.S. PATENT DOCUMENTS

| | | | | |
|---|---|---|---|---|
| 5,676,789 | A * | 10/1997 | Hamamura | B29C 63/0013 156/714 |
| 6,149,758 | A * | 11/2000 | Tsujimoto | H01L 21/67132 156/247 |
| 6,616,799 | B2 * | 9/2003 | Tsujimoto | H01L 21/67132 156/247 |
| 7,521,384 | B2 * | 4/2009 | Kanazawa | B29C 63/0013 438/455 |
| 7,823,619 | B2 * | 11/2010 | Yoshizawa | B65H 41/00 156/708 |
| 2005/0103422 | A1 | 5/2005 | Kawaguchi | |
| 2012/0298285 | A1 | 11/2012 | Kurimuru et al. | |

FOREIGN PATENT DOCUMENTS

| | | |
|---|---|---|
| JP | 2010-024038 A | 2/2010 |
| JP | 2010-168214 A | 8/2010 |
| WO | 2011/086626 A1 | 7/2011 |
| WO | 2011/089963 A1 | 7/2011 |

* cited by examiner

ADHESIVE SHEET JOINING METHOD AND ADHESIVE SHEET JOINING APPARATUS

CROSS REFERENCE TO RELATED APPLICATIONS

This application is a National Stage of International Application No. PCT/JP2013/079595 filed Oct. 31, 2013, claiming priority based on Japanese Patent Application No. 2012-243481 filed Nov. 5, 2012, the contents of all of which are incorporated herein by reference in their entirety.

TECHNICAL FIELD

The present invention relates to an adhesive sheet joining method and an adhesive sheet joining apparatus for joining an adhesive sheet to a steel plate of transport machinery including automobiles and various types of industrial machinery for reinforcement or vibration suppression.

BACKGROUND ART

In recent years, a steel plate tends to be made thinner for reduction in weight of vehicles such as automobiles. Such a thinner steel plate causes degraded rigidity thereof. Moreover, the thinner steel plate also causes easy receipt of vibrations and noises from an uneven road surface or an engine. Consequently, a resin sheet for reinforcing rigidity of a steel plate or for vibration suppression has been suggested. See Patent Literature 1.

Moreover, such an apparatus has been suggested that separates release paper from a reinforcing resin sheet and joins the resin sheet to side members constituting a side shell of an automobile body automatically. The apparatus joins the resin sheet as under. Firstly, the release paper is separated from the resin sheet. Specifically, a pressurizing roller presses against the release paper while swinging downward. Here, the release paper is larger than the resin sheet protruding from an end of a guide member provided in front of a conveyance belt. The roller is provided on an arm of a release paper pressurizing apparatus. The pressurizing roller moves downward to firmly hold a front end of the release paper together with the conveyance belt. Under such a condition, the conveyance belt continuously travels, whereby the release paper is separated from the resin sheet while the resin sheet is fed out from the guide member.

The resin sheet with the release paper separated therefrom is placed on a sheet supporting part in front of the guide member. The resin sheet on the sheet supporting part is pressed with a pad of a vacuum-suction apparatus, and is transported to the side members of the automobile. Thereafter, the pressurizing roller rolls on the resin sheet to join the resin sheet to the side members. See Patent Literature 2.

[Patent Literature 1] Japanese Patent Publication No. 2005-139218A

[Patent Literature 2] Japanese Patent Publication No. 2010-24038A

SUMMARY OF INVENTION

Technical Problem

The currently-used joining apparatus is designed to place the resin sheet with the release paper separated therefrom onto the sheet supporting part in front of the conveyance belt for delivering the resin sheet to the vacuum-suction apparatus. This leads to restriction in speed of separating the release paper from the resin sheet while the pressurizing roller firmly holds the release paper. Consequently, when a resin sheet having high adhesiveness and difficulty in separation of the release paper is adopted and the release paper is separated from the resin sheet, the restriction in separation speed leads to lower tension to a separation point on the release paper than an adhesive force of the resin sheet. As a result, the release paper is not completely separated from the resin sheet, and thus ruptures. Such a problem may arise.

In addition, the resin sheet with the release paper separated therefrom is placed on the sheet supporting part while an adhesive face thereof is directed downward. The sheet supporting part has serrated unevenness on a front face thereof for achieving difficulty in adhesion thereof to the resin sheet. Consequently, the unevenness on the front surface of the sheet supporting part is transferred to the adhesive face of the resin sheet by a pressing force applied when the pad of the vacuum-suction apparatus suction-holds the resin sheet on the sheet supporting part. When the thermosetting resin sheet under such a condition is joined to a thin steel plate and is subjected to a heat treatment, an uneven thickness of the resin sheet causes a wavy front face of the steel plate. Such a problem may also arise.

The present invention has been made regarding the state of the art noted above, and its primary object is to provide an adhesive sheet joining method and an adhesive sheet joining apparatus that allow joining of an adhesive sheet to a steel plate such as transport machinery accurately at high speed.

Solution to Problem

One embodiment of the present invention discloses an adhesive sheet joining method of joining an adhesive sheet to a workpiece. The method includes transporting the adhesive sheet while holding the adhesive sheet with a transporting mechanism, the adhesive sheet having a separator attached thereto that is larger than the adhesive sheet; separating the separator from the adhesive sheet by holding a portion of the separator protruding from a front end of the adhesive sheet with a holder on a tip of an arm of a separating mechanism in front of the adhesive sheet in a standby state, and by moving the holder in a direction crossing a transportation direction and moving the transporting mechanism in synchronization with movement of the holder in the transportation direction while folding back the separator at an end of a supporting member contacting the separator as a starting point; and joining the adhesive sheet by transporting the adhesive sheet with the separator separated therefrom to the workpiece with the adhesive sheet being held with the transporting mechanism.

Operation and Effect

With the method of the present embodiment, the separator of the adhesive sheet fed out from the end of the supporting member is held with the holder in front of the separator. The holder that holds the separator moves in the direction crossing the transportation direction, thereby allowing folding back and separation of the separator at the end of the supporting member. Upon separation of the separator, the transporting mechanism holding the adhesive sheet is synchronized with the movement of the holder. This achieves separation of the separator from the adhesive sheet at a speed for ready separation while tension is applied to the separator uniformly. In other words, the separation speed is settable appropriately regardless of the transportation speed of the adhesive sheet.

Moreover, the adhesive sheet with the separator separated therefrom is allowed to be joined to the workpiece by transporting the adhesive sheet with the adhesive sheet being held with the transporting mechanism. This eliminates formation of unnecessary unevenness or adhesion of dust on the adhesive face of the adhesive sheet. As a result, the adhesive sheet is joinable to the workpiece with a uniform thickness of the adhesive sheet.

Furthermore, the transporting mechanism holds the adhesive sheet during a period between separation of the separator from the adhesive sheet and adhesion of the adhesive sheet to the workpiece. Accordingly, there is no need to place and deliver the adhesive sheet in each of the processes. That is, a shorter cycle time than that in the currently-used method is obtainable.

Moreover, the separating includes adjusting a moving distance of the holder in accordance with a length of the adhesive sheet. Such is preferable.

For instance, the arm of the separating mechanism swings while the holder moves. Alternatively, the holder is moved in the direction crossing the transportation direction of the adhesive sheet as well as in the transportation direction.

With the method according to the above, the separator is allowed to be separated from the adhesive sheet while tension is applied to the separator uniformly until the release paper is completely separated from the adhesive sheet.

In addition, another embodiment of the present invention is disclosed.

That is, disclosed is an adhesive sheet joining apparatus joining an adhesive sheet to a workpiece. The adhesive sheet joining apparatus includes a transporting mechanism transporting the adhesive sheet having a separator attached thereto that is larger than the adhesive sheet, a supporting member located in at least a separation position of the separator and sandwiching the adhesive sheet along with the transporting mechanism, and a separating mechanism separating the separator from the adhesive sheet by holding a portion of the separator protruding from the adhesive sheet to be transported with the transporting mechanism using a holder at a tip of an arm and by moving the holder in a direction crossing a transportation direction of the adhesive sheet using a first drive mechanism while folding back the separator at an end of the supporting member as a starting point. The transporting mechanism moves while holding the adhesive tape in synchronization with separation of the separating mechanism, and transports and joins the adhesive sheet with the separator separated therefrom to the workpiece. This is the characteristic of the transporting mechanism.

With the construction above, the separator is separated from the adhesive sheet by folding back the separator with the supporting member when the holder of the separating mechanism is moved in the direction crossing the transportation direction. At this time, the transporting mechanism moves while holding the adhesive sheet in synchronization with the separation of the separator. Accordingly, the adhesive sheet sandwiched between the transporting mechanism and the supporting member is prevented from floating. In addition, the separator is allowed to be separated from the adhesive sheet while a tension is applied thereto uniformly.

Moreover, the transporting mechanism is allowed to transport and join the adhesive sheet with the separator separated therefrom to the workpiece while holding the adhesive sheet. This achieves reduced time for delivering the adhesive sheet to and from the joining apparatus individually. Consequently, a shorter cycle time for joining the adhesive sheet than that in the currently-used apparatus is obtainable.

Moreover, the separating mechanism may be constituted as under. For instance, the arm of the separating mechanism swings while moving in the direction crossing the transportation direction. Alternatively, a second drive mechanism is further provided that moves the holder of the separating mechanism in the transportation direction of the adhesive sheet.

The construction as above allows a variation in moving distance of the holder. In other words, the moving distance of the holder is adjustable in accordance with the length of the adhesive sheet, and the separator is allowed to be separated from the adhesive sheet under uniform application of tension.

Advantageous Effects of Invention

As noted above, the adhesive sheet joining method and an adhesive sheet joining apparatus according to the present embodiment allows separation of the separator from the adhesive sheet held with the transporting mechanism automatically with high accuracy, and allows the adhesive sheet to be transported and joined to the workpiece while holding the adhesive sheet with the transporting mechanism. Consequently, a shorter cycle time is obtainable for joining the adhesive sheet.

REFERENCE SIGN LIST

Figure 1:
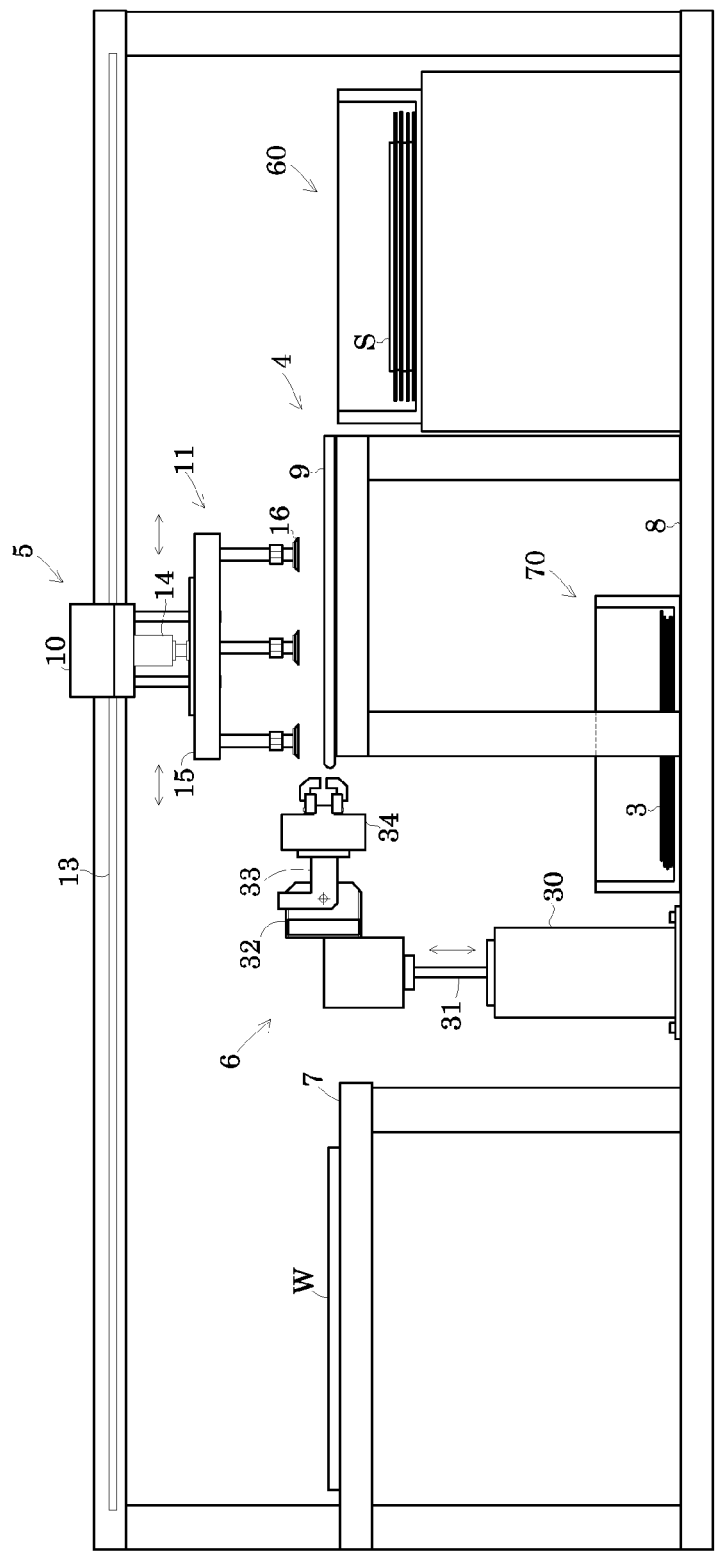
FIG. 1 is a front view of an adhesive sheet joining apparatus according to one embodiment of the present invention.

3 . . . separator
4 . . . separation table
5 . . . transporting unit
6 . . . separating unit
7 . . . holding table
30 . . . lifting mechanism
33 . . . swing arm
34 . . . chuck member
50 . . . controller
S . . . adhesive sheet
W . . . workpiece

DESCRIPTION OF EMBODIMENTS

The following describes one embodiment of the present invention with reference to drawings. Here, the present embodiment has been described taking joining operation of an adhesive sheet as one example. The adhesive sheet is formed by a resin composition for a reinforcement steel plate that reinforces a steel plate such as an engine hood or doors of an automobile.

<Adhesive Sheet>

Figure 3:
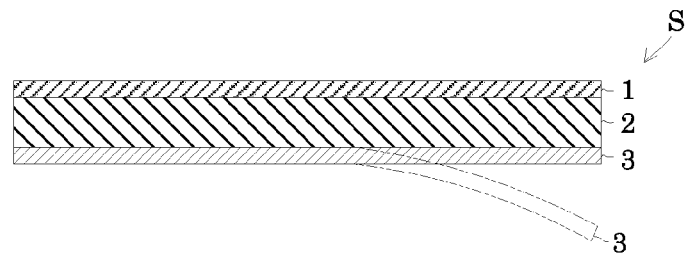
FIG. 3 is a longitudinal sectional view of an adhesive sheet.

FIG. 3 illustrates an adhesive sheet S in the form of a sheet having a resin layer 2 laminated on a reinforcement layer 1. In addition, a separator 3 is attached to the resin layer 2 opposite to the reinforcement layer 1. The separator 3 is larger than the resin layer 2.

For instance, the reinforcement layer 1 applies toughness to the resin layer 2 foamed due to heating. Examples of the reinforcement layer 1 include glass fiber cloth, resin glass-fiber cloth, a non-woven fabric made of a synthetic resin, a metal foil, and a carbon fiber.

<Adhesive Sheet Joining Apparatus>

FIG. 1 is a front view schematically illustrating an entire adhesive sheet joining apparatus according to the present embodiment.

The joining apparatus is constituted by a separation table 4, a transporting unit 5, a separating unit 6, and a holding table 7. The following describes the elements.

The separation table 4 includes a removable supporting plate 9 on an apparatus frame 8. The supporting plate 9 is flat and holds an entire surface of the adhesive sheet S. The supporting plate 9 is rounded at its end. Here, the supporting plate 9 corresponds to the supporting member in the present invention.

Figure 2:
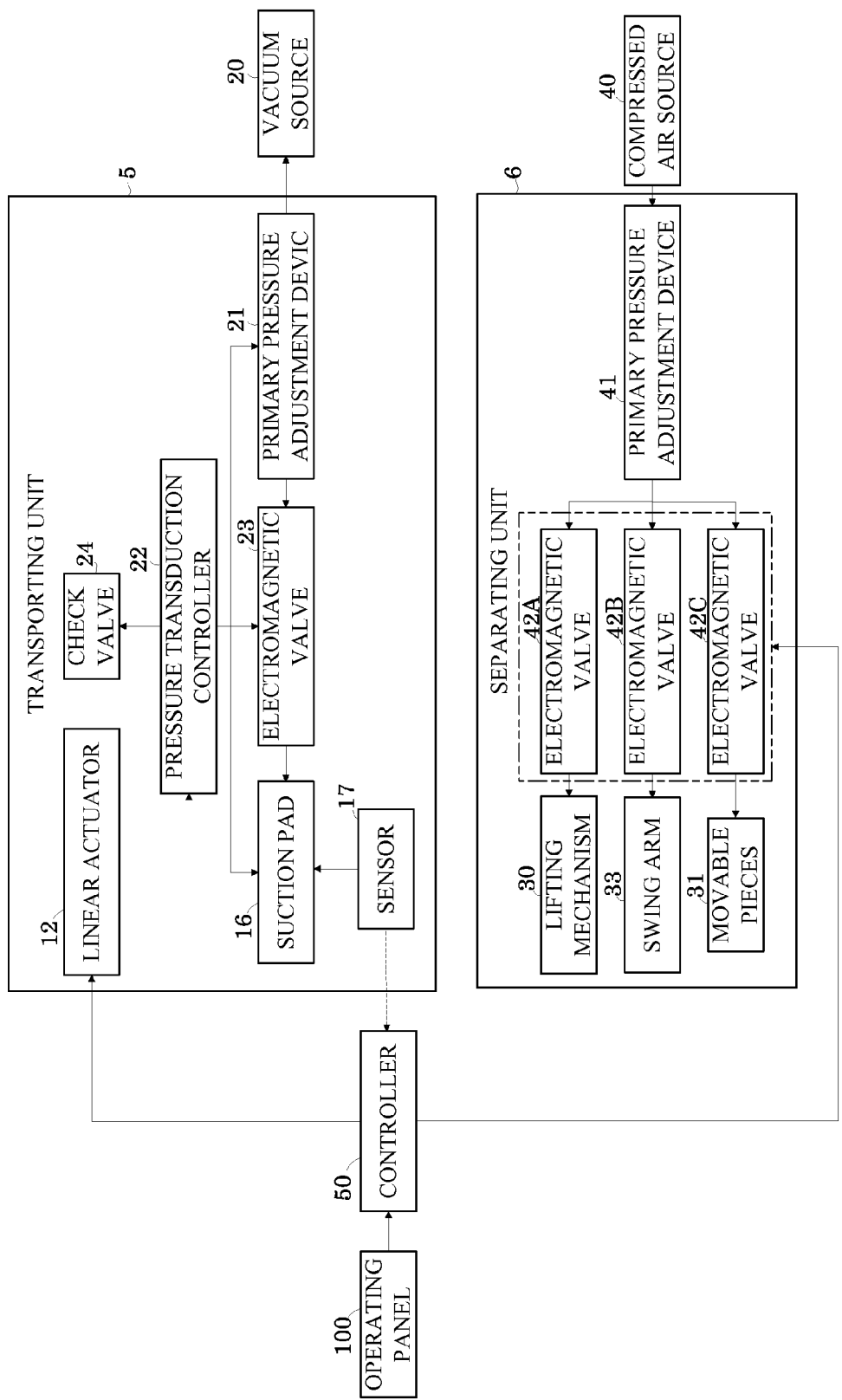
FIG. 2 is a block diagram schematically illustrating the adhesive sheet joining apparatus.

As illustrated in FIGS. 1 and 2, the transporting unit 5 is constituted by a movable board 10 and a holder 11. Here, the transporting unit 5 corresponds to the transporting mechanism in the present invention.

The movable board 10 reciprocates on a guide rail 13 with a linear actuator 12 provided with a drive unit such as a servomotor or a cylinder. The guide rail 13 is arranged along an upper apparatus frame horizontally.

The holder 11 includes a plurality of suction pads 16 on a supporting part 15 that moves vertically with an air cylinder 14 provided on the movable board 10. The suction pads 16 are each biased downward with an elastic body such as a spring. For instance, the suction pads 16 are arranged in a two-dimensional array at given pitches so as for a pressing force to be applied to an adhesive sheet S uniformly when the adhesive sheet S is joined to a workpiece W.

Each of the suction pads 16 has a suction face having a coaxial annular projection. The projection has a height so as to be accommodated within a recess of the suction pad 16. Consequently, the projection avoids suction of the adhesive sheet S into the suction pad 16.

The suction pad 16 is connected to an external vacuum source 20, a primary pressure adjustment device 21, a pressure transduction controller 22, and an electromagnetic valve 23 in this order from the upstream. The pressure transduction controller 23 is provided with a check valve 24.

The primary pressure adjustment device 21 transduces a suction force by the vacuum source 20 into given stable secondary pressure, and outputs the secondary pressure.

The pressure transduction adjustment device 22 is formed by a regulator, for example. The pressure transduction adjustment device 22 adjusts the preset secondary pressure (suction force) to be uniform. Specifically, a sensor 17 detects a variation in suction force of the suction pad 16 to obtain a detection signal. A deviation is calculated between actual pressure of the detection signal and reference pressure. The pressure transduction adjustment device 22 adjusts the suction force to return it to a set suction force by controlling an opening of the electromagnetic valve 23 and the check valve 24 depending on the calculated deviation.

Now reference is made back to FIG. 1. The separating unit 6 is constituted by a lifting mechanism 30 formed by an air cylinder, a swing arm 33, and a chuck member 34. The swing arm 33 is attached to a tip of a rod 31 of the air cylinder and is pivotally supported on a movable board 32 moving vertically. The chuck member 34 is provided at a tip of the swing arm 33 and is formed by a pair of movable pieces 34A and 34B. Here, the separating unit 6 corresponds to the separating mechanism in the present invention.

The swing arm 33 is so configured that pressure control allows adjustment of swing and stop as well as a swinging speed of the swing arm 33. The swing arm 33 is so configured that the pressure control also achieves relative movement of the movable pieces 34A and 34B close to or away from each other.

As illustrated in FIG. 2, the lifting mechanism 30, the swing arm 33, and the chuck member 34 are in fluid communication with a primary pressure adjustment device 41 and a compressed air source 40 via electromagnetic valves 42A, 42B, and 42C, respectively. Here, such an arrangement functions as the first drive mechanism of the present invention.

The primary pressure adjustment device 41 transduces air pressure from the compressed air source 40 into given stable secondary pressure, and outputs the secondary pressure.

The holding table 7 holds the workpiece W by suction or clamping.

The following describes a series of joining the adhesive sheet to the workpiece using the apparatus in the present embodiment with reference to FIGS. 2 to 9.

Firstly, a given condition illustrated in FIG. 2 is inputted into a controller 50 via an operating panel 100, and tension is calculated by which the separator 3 attached to the adhesive sheet S is allowed to be separated from the adhesive sheet S with no rupture. That is, a separating speed at which the separator 3 ruptures upon separation by folding back the separator 3 by the supporting plate 9 is determined in advance through experiments or simulations. Then, a permissible separation speed is determined from the separating speed, and the permissible separation speed is set in the controller 50. For instance, the permissible separation speed is determined from a downward moving speed of the lifting mechanism 30 and a downward swinging speed of the swing arm 33. The transporting unit 5 is set to be moved horizontally at the same speed as the separation speed.

Thereafter, a hardware construction such as a level of the holder 11 of the separating unit 6 is set. For instance, the level of the holder 11 is adjusted regarding an amount of deformation of the adhesive sheet S fed out from the supporting plate 9 so as for the end of the separator 3 attached to the adhesive sheet S to be inserted between the movable pieces 34A and 34B in front of the supporting plate 9 in a standby state.

Figure 4:
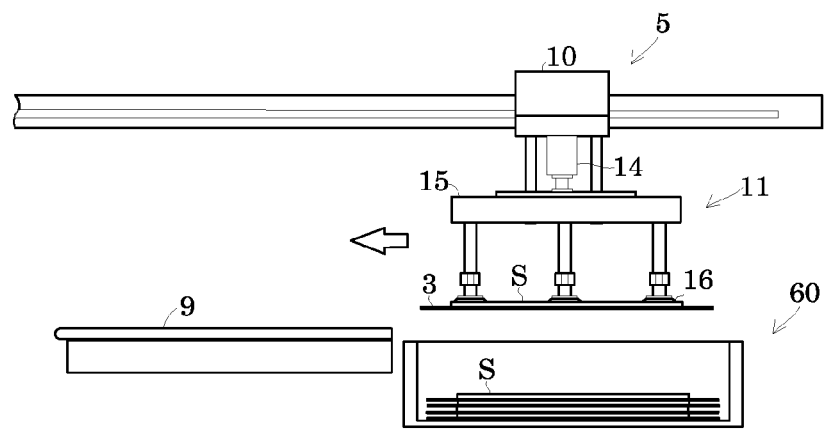
FIGS. 4 to 9 each illustrate joining operation of the adhesive sheet.

If various conditions are completely set, the apparatus actuates. Firstly, the transporting unit 5 is moved over a container 60 on the most upstream of the transportation path. As illustrated in FIG. 4, the transporting unit 5 moves the holder 15 to a given level using the air cylinder 14, whereby the suction pads 16 suction-hold the adhesive sheet S laminated in the container.

The transporting unit 5 transports the adhesive sheet S from the container 60 onto the supporting plate 9. Thereafter, the transporting unit 5 slides the adhesive sheet S on the supporting plate 9 while applying appropriate load to the adhesive sheet S with elastic bias by the suction pads 16.

Figure 5:
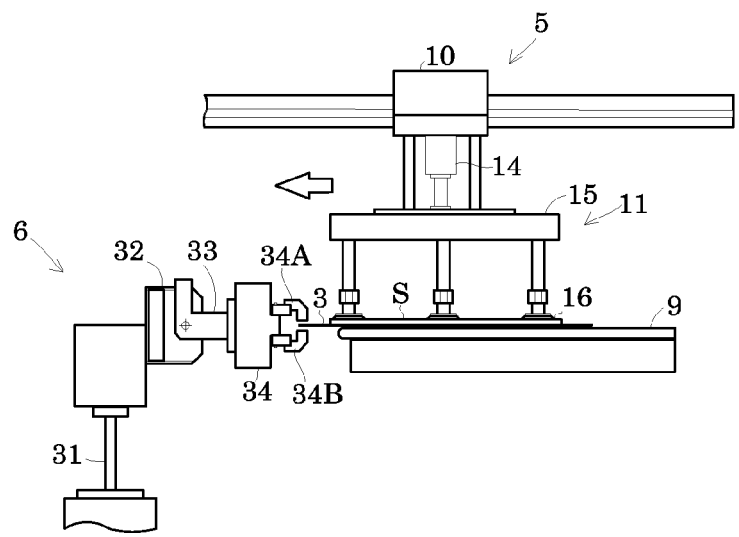

When the adhesive sheet S protrudes from the end of the supporting plate 9, the front end of the separator 3 is brought into insertion between the movable pieces 34A and 34B in an open standby state in front of the supporting plate 9. This is illustrated in FIG. 5.

Figure 6:
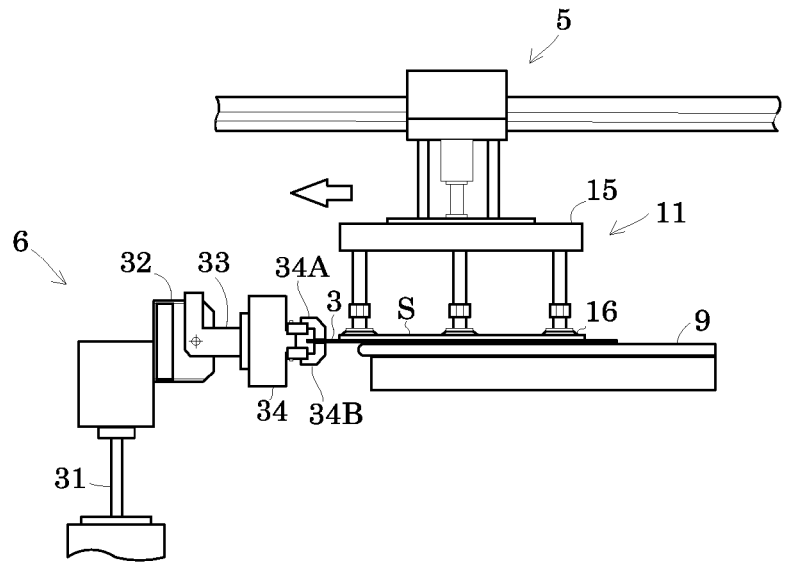
Figure 7:
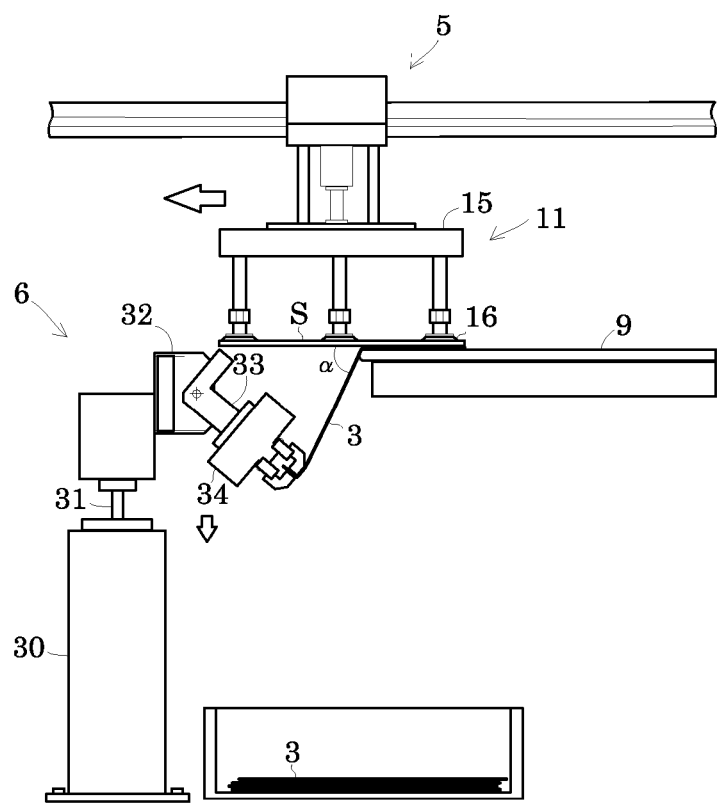

As illustrated in FIG. 6, when the separator 3 reaches a given position, the movable pieces 34A and 34B are closed to grip the front end of the separator 3. Thereafter, as illustrated in FIG. 7, the swing arm 33 swings downward while the lifting mechanism 30 moves downward. The swing arm 33 swings downward in the direction crossing the adhesive sheet S transported horizontally. Consequently, the separator 3 is folded back at the front end of the supporting plate 9 and then is separated. At this time, an angle α which the folded separator 3 forms with a longitudinal horizontal axis of the adhesive sheet S is maintained acute.

The transporting unit 5 moves horizontally in synchronization with separation of the separator 3 while suction-holding the adhesive sheet S.

Figure 8:
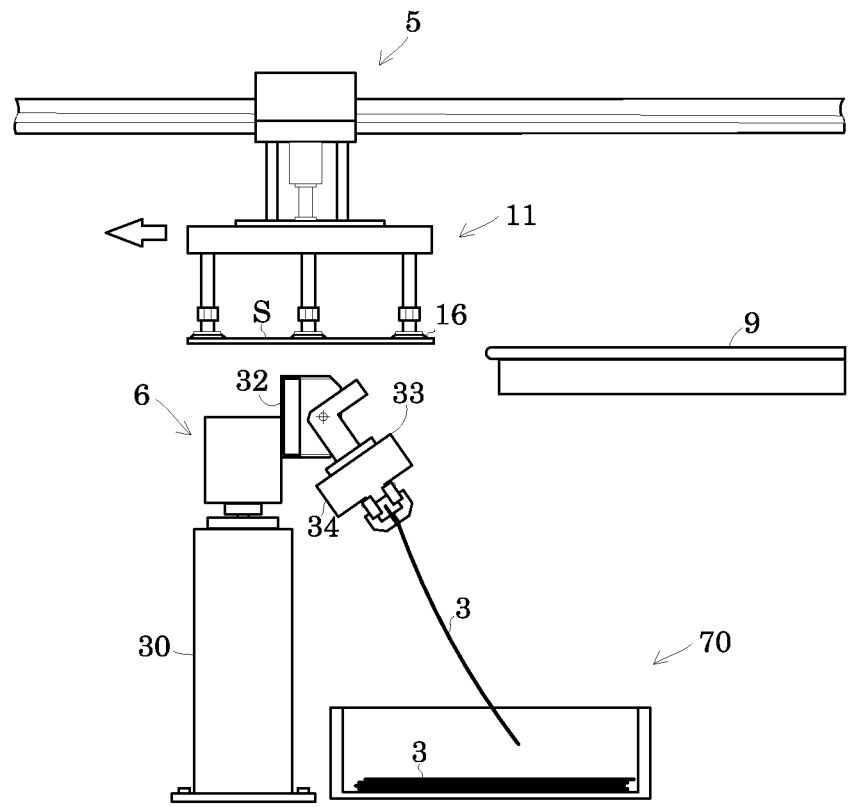

The separator 3 separated from the adhesive sheet S is collected in a collection container 70 below the swing arm 33, as illustrated in FIG. 8.

Figure 9:
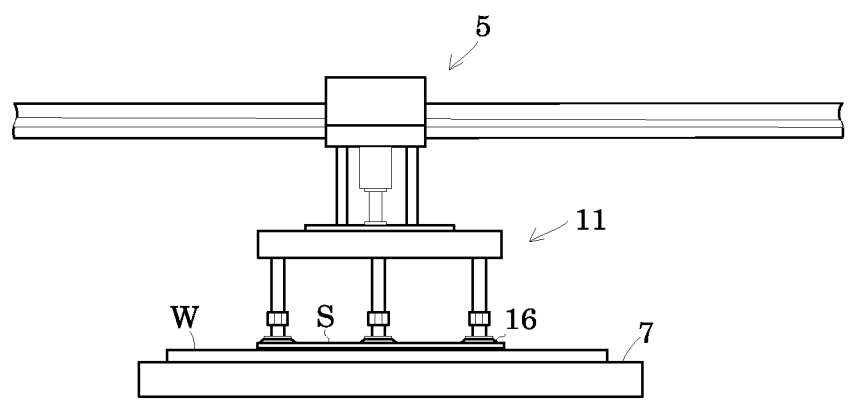
Figure 10:
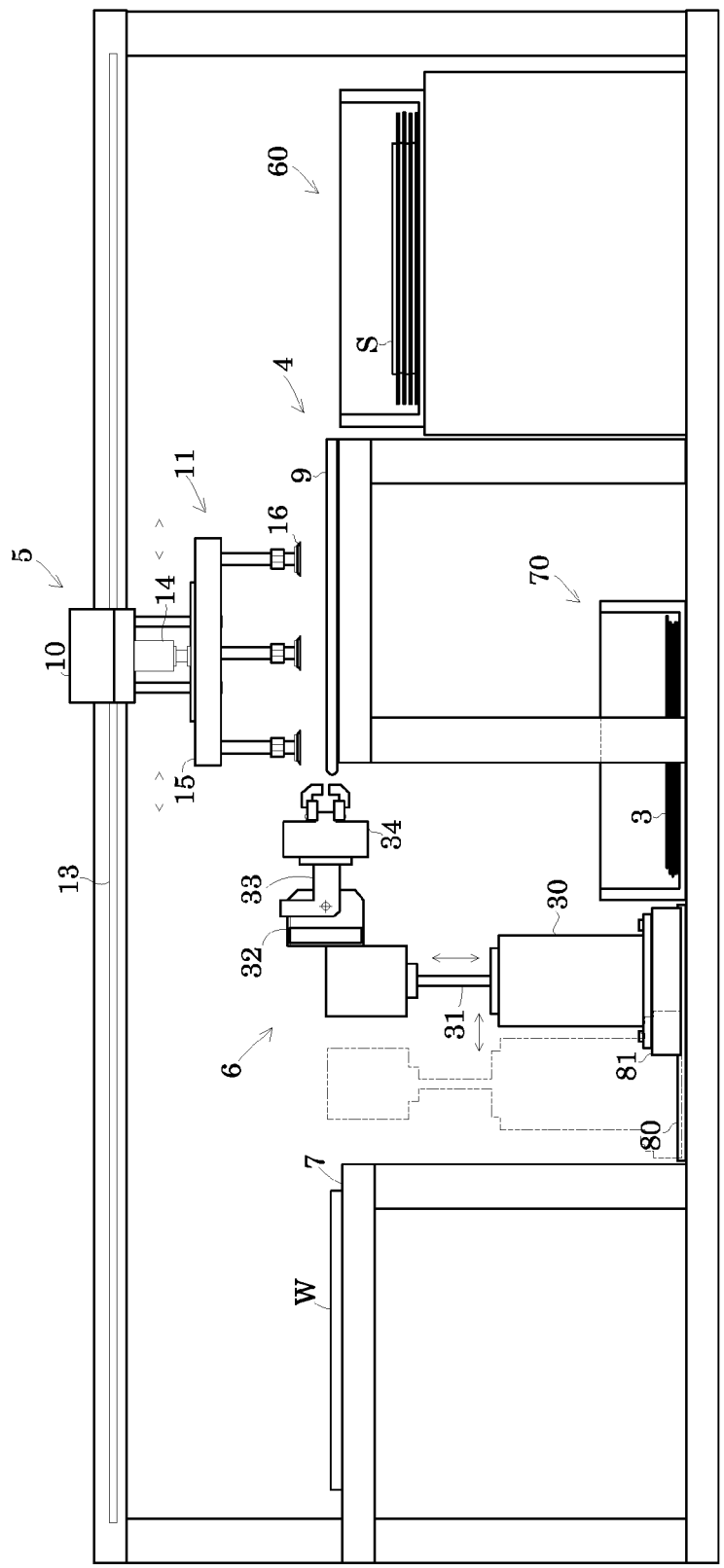
FIG. 10 is a front view according to one modification of the adhesive sheet joining apparatus according to the present invention.

The transporting unit 5 moves to the holding table 7 while suction-holding the adhesive sheet S. When reaching a given position above the workpiece W on the holding table 7, the transporting unit 5 moves the holder 15 downward with the air cylinder 14, whereby the adhesive sheet S is pressed against the workpiece W with the suction pads 16 to be joined to the workpiece W. This is illustrated in FIG. 9.

If the adhesive sheet S is completely joined to the workpiece W, a transporting mechanism, not shown, transports the workpiece W from the holding table 7. Simultaneously, the transporting unit 5 takes next joining operation.

With the apparatus of the present embodiment, if the front end of the separator 3 protruding from the supporting plate 9 is inserted and gripped between the movable pieces 34A and 34B of the chuck member 34, the lifting mechanism 30 moves downward and the swing arm 33 swings downward. Downward swinging of the chuck member 34 causes the separator 3 to be folded by an acute angle at the front end of the supporting plate 9. Accordingly, the separator 3 is separated from the adhesive sheet S. That is, the chuck member 34 is moved in the direction crossing the transportation direction of the adhesive sheet S. Simultaneously, the transporting unit 5 moves in the transportation direction while suction-holding the adhesive sheet S.

Consequently, appropriate setting of the separation speed is obtainable under constant tension regardless of the transportation speed of the transporting unit 5. In other words, tension exceeding an adhesive force of the adhesive sheet S is allowed to be applied to a separation starting point of the adhesive sheet S. This ensures separation of the separator 3 from the adhesive sheet S with no rupture of the separator 3.

Moreover, the adhesive sheet S with the separator 3 separated therefrom is suction-held on the transporting unit 5. Accordingly, the transporting unit 5 is allowed to transport the adhesive sheet S to the workpiece W under such a condition, and then to join the adhesive sheet S to the workpiece W. This eliminates the need to temporarily place the adhesive sheet S with the separator 3 separated therefrom on the mount table and then to deliver the adhesive sheet to another transporting mechanism. Consequently, adhesion of dust on the adhesive face can be suppressed and a shorter cycle time is also obtainable upon transportation.

The present invention can be modified as under.

(1) In the apparatus of the present embodiment, the separating unit 6 may be moved in the transportation direction. For instance, as illustrated in 10, the separating unit 6 is installed on a movable board 81 moving on a guide rail 80 with a driving unit. The guide rail 80 is arranged horizontally in the transportation direction. The movable board 81 is moved in the transportation direction in synchronization with separation of the separator 3, whereby a moving speed and a moving distance of the movable board 81 are controlled. Here, the guide rail 80, the movable board 81, and the driving unit of the movable board 81 function as the second drive mechanism of the present invention.

With the above construction, the moving distance of the movable board 81 is controlled in accordance with the length of a long adhesive sheet S. This achieves complete separation of the separator 3 from the adhesive sheet S while constant tension is applied to the separator 3.

Figure 11:
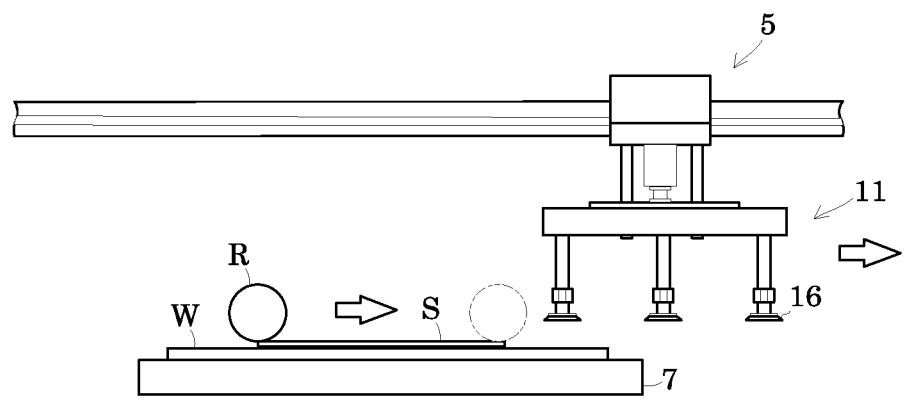
FIG. 11 illustrates joining operation of an adhesive sheet according to the modification.

(2) The following construction is applicable to the present embodiment. That is, the adhesive sheet S is joined to the workpiece W using the transporting unit 5. Thereafter, as illustrated in FIG. 11, a roller R rolls to press again the adhesive sheet S. Such a construction achieves adhesion of the adhesive sheet S to the workpiece W firmly.

(3) In the apparatus of the present embodiment adopting the adhesive sheet S having a length sufficient to separate the separator 3 with a moving distance by either downward movement of the lifting mechanism 30 or downward swinging of the swing arm 33, either the lifting mechanism 30 or the swing arm 33 may actuate.

(4) In the apparatus of the present embodiment, the separation direction of the separator 3 is not limited to a downward direction, but may be a direction crossing the transportation direction. Consequently, the apparatus is reversed so as for the separator 3 to be directed upward for separation. Alternatively, the transportation direction is turned to an upward or downward direction, i.e., a vertical direction, and accordingly the separation direction is turned to a horizontal direction. Such may be adopted.

(5) In the apparatus of the present embodiment, the supporting plate 9 may have a shorter length than the adhesive sheet S. That is, the supporting plate 9 may have the length sufficient to fold back and separate the separator 3 at the front end thereof while sandwiching the front end of the adhesive sheet S with the transporting unit 5 under a given load applied thereto.

INDUSTRIAL APPLICABILITY

As noted above, the present invention is suitable for separation of the separator from the adhesive tape and automatic adhesion of the adhesive tape to the workpiece.

The invention claimed is:

1. An adhesive sheet joining method of joining an adhesive sheet to a workpiece, the method comprising:
    transporting the adhesive sheet while holding the adhesive sheet with a transporting mechanism, the adhesive sheet having a separator attached thereto that is larger than the adhesive sheet;
    separating the separator from the adhesive sheet by holding a portion of the separator protruding from a front end of the adhesive sheet with a holder on a tip of an arm of a separating mechanism in front of the adhesive sheet in a standby state, and by moving the holder in a direction crossing with respect to a surface of the adhesive sheet moving horizontally in a transportation direction and moving the transporting mechanism in synchronization with movement of the holder in the transportation direction while folding back the separator at an end of a supporting member contacting the separator as a starting point; and
    joining the adhesive sheet by transporting the adhesive sheet with the separator separated therefrom to the workpiece with the adhesive sheet being held with the transporting mechanism.

2. The adhesive sheet joining method according to claim 1, wherein the separating comprises adjusting a moving distance of the holder in accordance with a length of the adhesive sheet.

3. The adhesive sheet joining method according to claim 1, wherein the separating comprises swinging the arm of the separating mechanism while moving the holder.

4. The adhesive sheet joining method according to claim 1, wherein the separating comprises moving the holder also in the transportation direction.

5. An adhesive sheet joining apparatus joining an adhesive sheet to a workpiece, the adhesive sheet joining apparatus comprising:
- a transporting mechanism transporting the adhesive sheet having a separator attached thereto that is larger than the adhesive sheet;
- a supporting member located in at least a separation position of the separator and sandwiching the adhesive sheet along with the transporting mechanism; and
- a separating mechanism separating the separator from the adhesive sheet by holding a portion of the separator protruding from the adhesive sheet to be transported with the transporting mechanism using a holder at a tip of an arm and by moving the holder in a direction crossing with respect to a surface of the adhesive sheet moving horizontally a transportation direction of the adhesive sheet using a first drive mechanism while folding back the separator at an end of the supporting member as a starting point,
- the transporting mechanism moving while holding the adhesive sheet in synchronization with separation of the separating mechanism, and transporting and joining the adhesive sheet with the separator separated therefrom to the workpiece.

6. The adhesive sheet joining apparatus according to claim 5, wherein the arm of the separating mechanism swings while moving in the direction crossing the transportation direction.

7. The adhesive sheet joining apparatus according to claim 5, further comprising: a second drive mechanism moving the holder of the separating mechanism in the transportation direction of the adhesive sheet.

* * * * *